United States Patent
Gonthier

(10) Patent No.: US 6,183,676 B1
(45) Date of Patent: Feb. 6, 2001

(54) SIZED GLASS FIBERS INTENDED FOR REINFORCING POLYMERS

(75) Inventor: Michel Gonthier, Jacob-Bellecombette (FR)

(73) Assignee: Vetrotex France S. A., Chambery (FR)

( * ) Notice: Under 35 U.S.C. 154(b), the term of this patent shall be extended for 0 days.

(21) Appl. No.: 09/091,417

(22) PCT Filed: Oct. 29, 1997

(86) PCT No.: PCT/FR97/01938

§ 371 Date: Aug. 26, 1998

§ 102(e) Date: Aug. 26, 1998

(87) PCT Pub. No.: WO98/18737

PCT Pub. Date: May 7, 1998

(30) Foreign Application Priority Data

Oct. 29, 1996 (FR) .................................................. 96 13174

(51) Int. Cl.$^7$ .......................... B29C 41/10; B29C 70/06; B29C 70/30
(52) U.S. Cl. .......................... 264/128; 264/109; 264/309; 428/375; 428/378
(58) Field of Search .................................... 264/109, 123, 264/128, 257, 309, 328.18; 523/402, 412, 415; 428/268, 288, 290, 363, 375, 378, 403, 407

(56) References Cited

U.S. PATENT DOCUMENTS

| 3,968,068 | * | 7/1976 | Haggerty | 260/29.6 RB |
| 4,358,501 | * | 11/1982 | Temple | 428/268 |
| 4,457,970 | * | 7/1984 | Das et al. | 428/290 |

FOREIGN PATENT DOCUMENTS

95/09133 * 4/1995 (WO).

* cited by examiner

*Primary Examiner*—Angela Ortiz
(74) *Attorney, Agent, or Firm*—Oblon, Spivak, McClelland, Maier & Neustadt, P.C.

(57) ABSTRACT

The invention relates to glass fibers coated with an sizing composition. The said sizing composition, which is obtained in particular from an aqueous solution, comprises as bonding film-forming agents, a combination, of at least one low-molecular-weight polyvinyl acetate A, of at least one thermally self-crosslinking polyvinyl acetate copolymer B, in an A/B weight ratio greater than or equal to 1.

34 Claims, No Drawings

SIZED GLASS FIBERS INTENDED FOR REINFORCING POLYMERS

BACKGROUND OF THE INVENTION

1. Field of the Invention

The invention relates to sized glass fibres intended for reinforcing organic materials of the polymer type, in order to obtain so-called composite materials having enhanced mechanical properties.

The invention also relates to the sizing compositions used to coat the said fibres, to the process for manufacturing the composites, and to the composites thus obtained.

In a known manner, reinforcing glass fibres are manufactured from molten glass threads flowing through die orifices, these threads being drawn mechanically in the form of continuous filaments. These filaments are coated with an sizing composition usually in aqueous solution, by passage over sizing members of the coating roll type, before being assembled, torsion-free, as base fibres, which are then collected, in particular by winding on a rotating support.

The use of sizing compositions is made necessary for various reasons: firstly, at the stage of manufacturing reinforcing fibres, the sizing serves as lubricant, protecting the fibres from the abrasion that results from them rubbing against various collecting, winding, etc. members at high speed.

In addition, especially once the sizing has dried, polymerized and/or crosslinked, it provides the fibres with a certain amount of cohesion and makes them hold together by creating inter-filament bonds, thereby avoiding untimely breakage of the fibres and facilitating their handling.

Secondly, at the stage of manufacturing the composite material, sizing enhances the wetting/impregnation of the fibres by the polymer matrix to be reinforced—which is referred to hereinbelow as the "resin"—by helping to create fibre/matrix bonds. The mechanical properties of the final composite material and its resistance to osmosis depend, in particular, on the quality of the fibre/matrix adhesion and the wetting or impregnation capacity.

It is thus seen that in order to assume all of these roles, the formulations of sizing compositions for reinforcing glass fibres are very complex to develop since they must take account of many manufacturing parameters and will depend especially on the type of fibre to be coated, on the type of polymer used for the resin of the composite and, lastly and above all, on the actual mode of manufacture of the composite.

The invention relates particularly to sizing for reinforcing fibres which are incorporated into thermosetting-type polymer matrices such as those belonging to the polyester and/or epoxide family in order to manufacture composite articles by processes known as "open cast processes", that is to say processes by simple moulding, without a counter-mould, which have the advantage of being able to produce, for low investment costs, prototypes, one-off articles or short-run articles, with great freedom in the choice of the shape and the size of the articles.

The invention relates more particularly to sizing for open cast processes known as "moulding by simultaneous spraying", in which the material is deposited in the mould by means of a spray gun which cuts the glass and sprays it onto the mould at the same time as the resin. The operation is usually completed by running a splined roller over it, this smoothing the surface and ironing out any bubbles. Optional attractive of a layer of pure resin, or "gel-coat", to the mould makes it possible to obtain a finished face of attractive appearance.

Although moulding by simultaneous spraying is relatively simple to carry out, it requires that the glass fibres, and most particularly their sizing, have properties that are highly specific to this technique, and these properties may appear to be relatively incompatible with each other.

It is important for the fibres to stay held together after cutting and not to "filamentize" until the end of the spraying against the mould. In addition, it is important for the spraying of the cut fibres to be carried out in a well-dispersed manner, in order for them to form a "carpet" of very uniform density and thickness against the mould.

It is also necessary to obtain impregnation of the reinforcing fibres by the resin which is both rapid and complete, since there is no separate step here of mixing by blending between resin and reinforcing fibres. The sizing should thus aid this impregnation, by being very chemically compatible with the resin in order to establish the fibre/resin bonds.

But from another standpoint, it is just as necessary for the resin/reinforcing fibre mixture to "hold" well to a vertical wall once the spraying has been carried out, both before and after the smoothing operation with the roller, that is to say that there should be no sagging of the mixture or of the resin which tends to accumulate in the lowest part of the open mould.

It is thus also important for this mixture to be sufficiently rigid, with a reinforcing fibre "network" which can hold the resin in place against the surface of the mould, which rather tends towards sizing which is less "compatible" and less "soluble" in the resin.

2. Description of the Related Art

A compromise therefore needs to be found in order for the sizing formulation to be suitable. Thus, sizing suited to this type of moulding is known from patent FR-2,279,688, which uses an aqueous mixture based on polyvinyl acetate, a lubricant, chromic methacrylate chloride and gamma (ethylenediamine)-propyldimethoxysilane. With only one bonding film-forming agent made of polyvinyl acetate, it would seem that the compromise can operate only at the expense either of the rate of impregnation or of the holding, without it being possible to optimize these two properties at the same time.

BRIEF SUMMARY OF THE INVENTION

The aim of the invention is thus to develop novel sizing for reinforcing fibres which is particularly suited to the technique of open-cast moulding, in particular by simultaneous spraying, and which especially makes it possible to jointly achieve better fibre/resin impregnation and better holding of the mixture in the mould.

DETAILED DESCRIPTION OF THE INVENTION

The subject of the invention is glass fibres coated with an sizing composition which is obtained in particular from an aqueous solution and which comprises, as bonding film-forming agents, a combination of at least one low-molecular-weight polyvinyl acetate (referred to hereinbelow as "A") and of at least one thermally self-crosslinking polyvinyl acetate copolymer (referred to hereinbelow as "B"), in an A/B weight ratio greater than or equal to 1.

In this respect, it should be pointed out that, according to the invention, the expression "glass fibres coated with an sizing composition" is understood to refer to glass fibres "which have been coated with an sizing composition comprising . . . ", that is to say not only fibres coated with the composition in question obtained at the outlet of the size deposition device(s) (it being optionally possible for the components of the sizing composition to be deposited separately or in several steps), but also these same fibres after drying and/or after other treatments intended, for example, to remove certain components from the sizing composition (in particular the water included in the composition when the composition is in the form of an aqueous dispersion or solution) and/or to polymerize and/or to crosslink certain components of the said composition.

Still within the context of the invention, the term thermally "self-crosslinking" is understood to refer to a copolymer having a certain number of functions which are capable of reacting to heat and of creating additional bonds in the copolymer network, without it being necessary to add a specific crosslinking agent, these bonds being intended to crosslink the copolymer and/or to increase its degree of polymerization. The term "self-crosslinking" is also understood to refer to a polymer which is capable of crosslinking with at least one other constituent of the sizing composition, especially with the polyvinyl alcohol contained in the low-molecular-weight polyvinyl acetate A, or alternatively a silane, a plasticizer, etc.

As mentioned above, the invention relates to the copolymer "B" when it is self-crosslinking, but also when it has partially or totally crosslinked after a given heat treatment of the fibres. The crosslinking can be facilitated by a catalyst, in particular of the quaternary ammonium salt type.

Incidentally, however, by the term "self-crosslinking", the invention does not exclude the possibility of incorporating a crosslinking agent into the sizing.

In the context of the invention, the term fibres is understood to refer not only to the base fibres obtained by torsion-free assembly of a plurality of filaments in a die, but also any product derived from these base fibres, in particular assemblies of these base fibres into rovings.

Thus, these may be "assembled" rovings, which are obtained by simultaneously unwinding several reels of base fibres and then reassembling them and winding them onto a rotating support in the form of base rough rovings. They can also be "direct" rovings, which are slubs with a yarn count (mass per unit length) equivalent to that of the assembled rovings, but which are obtained directly at the die from a plurality of filaments before being wound on rotating supports.

The combination of the compounds "A" and "B" has proved to be extremely advantageous for glass fibre sizings intended to be used in techniques of moulding by simultaneous spraying. The properties of the compounds "A" and "B" are, in fact, entirely complementary: the low-molecular-weight polyvinyl acetate A has high chemical compatibility with the resins usually used in these techniques, that is to say polyester and/or epoxy resins. As a result, it is able to "dissolve" very rapidly and completely in these types of resin, thereby achieving high and rapid impregnation of the reinforcing fibres by the resin and enhancing the shapeability of the assembly. What is more, this advantageous property does not have to be obtained to the detriment of the mechanical strength of the fibre/resin mixture, since compound "B", which is less "soluble" in the resin, at the same time ensures that the reinforcing fibres are sufficiently rigid, ensures well-dispersed spraying and holds the fibre/resin assembly in place in the mould up to the end of the moulding operations. This therefore simultaneously provides good "anchoring" of the resin by the reinforcing-fibre network and good distribution/dispersion of the two types of material in the mixture.

By modifying the respective contents of "A" and "B" in the bonding composition, the desired properties can optimized. However, it is preferable to choose an A/B weight ratio of at least 1, since the impregnation of the fibres by the resin is rarely sufficient if a ratio less than 1 is chosen. Advantageously, the A/B weight ratio lies between 1.3 and 10, in particular between 2.5 and 6.0.

The properties of each of the compounds "A" and "B" can also be favourably adjusted depending on the exact type of resin or the type of fibre.

Thus, a polyvinyl acetate "A" with a weight-average molecular weight (determined by gel permeation chromatography) of not more than 60,000, in particular between 60,000 and 40,000, for example about 50,000 is preferably chosen. This weight range usually corresponds to that defined as "low molecular weight" for a polymer of this type. It enables the polymer to "dissolve" readily in the resin. Another way of quantitatively measuring this property is to evaluate the hot solubility in toluene of compound "A". Advantageously, a polyvinyl acetate which has such a solubility of at least 70%, in particular between 70 and 95%, especially about 85%, is selected.

As regards the copolymer "B", this is thus derived from the copolymerization of polyvinyl acetate and of at least one other type of monomer. A specific example of this copolymer is a copolymer of polyvinyl acetate and of N-methylolacrylamide. It is chosen so as to be markedly less "soluble" than "A" in the resin, and this lesser solubility can be evaluated by measuring its hot solubility in toluene, just as for "A". The copolymer in "B" is preferably chosen such that it has a hot solubility in toluene of not more than 60%, and especially of about 50%.

Moreover, it may be advantageous to introduce at least one plasticizer, referred to hereinbelow as agent "C" into the bonding composition, which agent will at least partially plasticize the vinyl acetate "A" and/or the copolymer "B". By making the "A" and/or "B" polymer chains more flexible, it lowers their glass transition temperature Tg. Its presence improves the shapeability of the fibres/resin mixture, that is to say its ability to match the shapes of complex moulds more closely. Glycol derivatives, for example a mixture of diethylene glycol dibenzoate and propylene glycol dibenzoate, can be used as plasticizers. The plasticizer content in the sizing composition should be adjusted in order to obtain the desired effect of good shapeability while at the same time retaining a certain level of stiffness in the reinforcing fibres. It is thus advantageously possible to choose to introduce one or more plasticizers "C" into the composition in order for the weight ratio C/(A+B) to be between 0.05 and 0.2, in particular between 0.10 and 0.15.

During the preparation of the sizing composition in an aqueous phase, in order to facilitate and especially to accelerate the plasticization reaction of "A" and/or "B", it is advantageous to combine at least one surfactant with the plasticizer(s) when the latter are not soluble or are only sparingly soluble in water. This surfactant, referred to hereinbelow as "D", is advantageously nonionic and chosen, for example, from polyethylene glycol derivatives with a molecular weight of not more than 400.

By improving the solubilization of the plasticizer(s), the use of a surfactant "D" results in time being saved in the manufacture of the sizing composition, the plasticization taking place much more quickly, for example in a period of about 30 minutes.

Moreover, the sizing composition according to the invention can advantageously comprise a certain number of additives.

The sizing composition can also comprise at least one coupling agent which makes it possible to attach the sizing to the surface of the glass. These can especially be compounds chosen from the silane family, and more particularly a combination of at least two silanes such as an aminosilane, referred to hereinbelow as "E", and an unsaturated silane such as a vinylsilane or a methacrylsilane, referred to hereinbelow as "F". This combination is preferred since these two silanes have quite complementary roles, somewhat in the same way as the polyvinyl acetate "A" relative to the copolymer "B". This is because the aminosilane "E" contributes towards enhancing well-dispersed spraying and good mechanical "holding" of the fibre/resin mixture in the mould, whereas the unsaturated silane "F" rather has a tendency to improve the impregnation/wetting of the fibres by the resin. The combination of these two types of silane also enhances the ability of the thread to be cut properly. It should be noted that this combination makes it possible to impart to the fibres a cut quality equivalent to that generally obtained with fibres whose sizing composition comprises chromium or titanium derivatives.

The sizing composition can also contain at least one lubricant and/or antistatic agent, referred to hereinbelow as "G", in particular a cationic compound of the organic quaternary ammonium salt type. This agent especially enhances the protection of fibres against mechanical abrasion during their manufacture.

All of these additives work together towards obtaining reinforcing fibres which can be manufactured easily, which hold together well, which lend themselves to a cutting operation with no problem and which are satisfactorily incorporated into the resin during manufacture of the composite.

Preferably, the content of the various compounds constituting the sizing composition is chosen such that its dry extract is between 2 and 10%, and in particular about 6%.

The coated fibres according to the invention advantageously have a filament diameter of 12 to 15 micrometers, in particular 13 micrometers, and a yarn count (or mass per unit length) of 40 to 60 tex, in particular about 45 tex (1 tex corresponds to 1 g/km).

It is not common to use filament diameters of at least 12 micrometers in the case of moulding by simultaneous spraying, filament diameters of 10 or 11 micrometers being rather preferred in this case in order to enhance the impregnation of the fibres by the resin. However, by virtue of the sizing composition according to the invention, such filament diameters can be permitted without prejudicing the capacity for impregnation of the fibres and for shapeability of the fibre/polymer assembly, this being industrially advantageous: it is well known that manufacturing filaments of relatively large diameter allows better fibre-yields to be achieved, the risk of breakage of the formation fibres in the production line being especially reduced.

It is preferable to use fibre with yarn counts of 40 to 60 tex, that is to say not very high counts, and this is for various reasons: firstly, in using relatively high filament diameters, fibres with low yarn counts should, in parallel, be chosen: thus, there is no risk of increasing the stiffness of the fibre excessively, too stiff a fibre being unfavourable towards the correct shapeability of the fibre/resin mixture against the mould. Next, with a low fibre yarn count, there is good distribution of the fibres in the resin, a uniform sprayed, homogeneous and dense network of cut fibres is obtained, which consequently has a surface whose permeability is reduced. As a result, the area of the reinforcing fibres in contact with the resin is optimal, the level of resins "absorbed" by the fibres is increased and the holding of the mixture to the wall of the mould is, before passage of the roller, markedly enhanced.

A subsidiary advantage to be had in using fibres with a low yarn count is the improvement in the surface appearance of the composite material once its manufacture is complete: it has a less "marked", less "taut" appearance, in the sense that the "imprint" of the threads is much less visible and there is much less relief.

It can moreover be seen that the invention applies to the manufacture of a composite by simultaneous spraying, whether or not use is made of a layer of pure resin known as a "gel coat" prior to spraying.

The subject of the invention is also the sizing composition itself, before it has been deposited on the reinforcing fibres. Preferably, it is prepared in aqueous solution and contains:

polyvinyl acetate "A" in a content, as a percentage by weight of the aqueous solution, of between 5 and 9, copolymer "B" in a content, as a percentage by weight of the aqueous solution, of between 1 and 4, and also with an A/B weight ratio greater than or equal to 1, silane derivatives, in particular an aminosilane "E" and an unsaturated silane "F" in a content, as a percentage by weight of the aqueous solution, of between 0.05 and 5, one (or more) plastisizer(s) "C", in particular of the glycol derivative(s) type, in a content, as a percentage by weight of the aqueous solution, of between 0.4 and 0.9, at least one surfactant "D" in a content, as a percentage by weight of the aqueous solution, of between 0.1 and 0.4, one (or more) lubricant(s) "G", in particular an organic quaternary ammonium salt, in a content, as a percentage by weight of the aqueous solution, of between 0.1 and 0.3, optionally, an organic acid "H" such as formic acid, in an amount which is sufficient to adjust the pH of the aqueous solution to the desired value.

As mentioned above, the aqueous solution is deposited on the filaments which will constitute the base fibres. The water is usually removed by drying the fibres/rovings once they have been collected. It is during this drying step or subsequently during a specific heat treatment that the total or partial polymerization/crosslinking in particular of the compound "B" takes place.

The subject of the invention is also the process for the manufacture of such an sizing composition, this process preferably containing a step of hydrolysis of the silane derivatives "E" and "F" in a solution S1, a step of plasticization of the compounds "A" and "B" together with the compound "C", in the presence of compounds "D" and optionally "G" in a solution S2 and, lastly, mixing of the said solutions S1 and S2.

The subject of the invention is also composite materials combining reinforcing fibres in which at least some have been coated with the sizing composition as defined above, and a thermosetting-type polymer such as polyester and/or epoxy. The glass content in the composite materials is generally between 20 and 40, in particular between 25 and 35% by weight.

The subject of the invention is also the process for the manufacture of these composite materials, using the technique of moulding by simultaneous spraying of the resin and the cut and sized glass fibres against an open mould. Use of the sizing composition according to the invention is not limited only to the technique of moulding by simultaneous spraying; the composition can be used more generally for any technique of manufacturing composite materials using reinforcement in the form of cut glass fibres. This can thus be a technique of compression moulding of preimpregnated mat, occasionally referred to as SMC (sheet moulding compound), in which a material is used in the form of a sheet of prepreg comprising the cut glass fibres, the resin and the necessary adjuvants. It can also be a technique of moulding by centrifugation, consisting in spraying cut fibres and resin into a mandrel which is subjected to a high speed of rotation, the resin impregnating the reinforcing material under the effect of the centrifugal force.

Other details and advantageous characteristics of the invention will emerge from the description below, with the aid of non-limiting examples:

EXAMPLE 1

An sizing composition according to the invention was manufactured using the following starting materials:

compound "A": polyvinyl acetate of molecular weight 50,000, marketed by Vinamul under the reference "Vinamul 8852", compound "B": copolymer of polyvinyl acetate and of N-methylolacrylamide, marketed by Vinamul under the reference "Vinamul 8828", compound "C": mixture of diethylene glycol dibenzoate and propylene glycol dibenzoate in a 50/50 weight ratio, marketed by Akzo Chemical under the reference "K-Flex 500". Alternatively, compound "C" can also be composed of butylbenzylphthalate, of the type marketed by Monsanto under the reference "Santicizer 160" or dioctyl adipate of the type marketed by BASF under the reference "Plastomoll DOA", compound "D": polyethylene glycol of molecular weight 400, marketed by Steran Europe under the reference "Secoster ML 400". Alternatively, polyethylene of slightly higher molecular weight can be used, in particular of molecular weight 1000, such as that marketed under the name "Carbowax 1000", compound "E": diaminosilane, marketed by OSI under the reference "A 1126", it also being possible for other aminosilanes to be suitable, compound "F": vinyltriethoxysilane, marketed by OSI under the reference "A 151". This compound "F" can consist of other types of unsaturated silane. It can thus be vinyltri($\beta$-methoxyethoxy)silane or $\gamma$ methacryloxypropyltrimethoxysilane, such as those marketed by OSI under the references "A172" and "A174", respectively, compound "G": quaternary ammonium salt, marketed by Akzo Nobel Chemicals under the reference "Arquad C35" and having the formula cocotrimethyl-ammonium chloride. This compound "G" can also be based on an oxyethylene quaternary ammonium salt marketed by DSM under the reference "Neoxil A05620", or alternatively based on alkoxylated quaternary ammonium ethosulphate marketed by Henkel Corporation under the reference "Emerstat 6660".

formic acid, compound "H".

The sizing composition is an aqueous solution; the weight content of each of the compounds introduced relative to the final total volume of water is specified below:

A: 6.50%
B: 2.60%
C: 0.59%
D: 0.26%
E: 0.26%
F: 0.26%
G: 0.20%
H: sufficient amount to have a final pH of about 4.0.

3600 liters of the sizing composition are manufactured in the following way:

a) The silanes in "E" and "F" are hydrolysed together: 1800 liters of water are acidified with 1.5 kg of formic acid at a concentration of 80% by volume in water. Silane "F" is introduced first, followed, 20 minutes later, by silane "E". The pH of the hydrolysate is adjusted to 4.5, if necessary, by adding formic acid.

b) Polyvinyl acetate "A" and the copolymer "B" are plasticized together: "A" and then "B" are successively introduced into a separate vat. This is diluted to about 400 liters with water, after which first compound "G" and then the mixture "D" plus "C" are successively added without prior dilution. The mixture is left stirring for at least 15 minutes and is then diluted to about 1000 liters with water. By virtue of the combination of the plasticizer "C" and the nonionic surfactant "D", this plasticization step is very short.

c) The manufacture is completed: the plasticized mixture is poured into the hydrolysate, the volume is adjusted to 3600 liters with water, the pH is adjusted to 4 by adding formic acid, if necessary, and the dry extract is adjusted to about 6.3%.

The sizing composition thus prepared is used to size, in a known manner, base fibres consisting of glass filaments 13 micrometers in diameter, assembled in the form of a reel, under a 2400-hole die, the yarn count of these base fibres being 44 tex.

The reels of base fibres are dried, also in a known manner, by a suitable heat treatment, this drying intended to remove the water from the sizing composition and at least partially to crosslink/polymerize all the compounds in the composition which are capable of doing so, and most particularly herein the compound "B". In general, the drying step lasts 12 to 18 hours depending on the weight of the reel, at a temperature of about 110 to 140° C.

Still in a manner which is known per se, the glass fibres are then assembled as roving, each roving consisting of 54 base fibres.

The roving thus obtained was used to manufacture composite articles by the technique of moulding in an open mould known as simultaneous spraying, under the following conditions:

the mould is a mould in the shape of a staircase, including a vertical wall 1 meter in height and then a staircase step 0.20 meter in depth and 0.20 meter in height, and then 1 meter of horizontal wall. This wall includes two grooves 2 cm in depth, to evaluate the shapeability of the resin/reinforcer mixture, the resin is an ortho-phthalic unsaturated polyester resin of low viscosity, of average reactivity and non-thixotropic. This is the resin marketed by Cray Valley under the reference "Norsodyne S 2010V". Its viscosity is 5.6 poises at 18° C., spraying against the mould is carried out using a spray gun marketed by Matrasur under the reference "Venus", with two cross-layers, vertically and horizontally, the resin/reinforcing fibre proportion is such that the composite contains 27% glass by weight.

EXAMPLE 2

This is identical to Example 1 in all respects, except that the base fibres used have a yarn count of 60 tex instead of 44 tex.

EXAMPLE 3

This is a comparative example, in the sense that the sizing composition of this example does not use the combination of the two bonding agents A and B of Example 1, but only the compound A polyvinyl acetate, in a content, by weight in the aqueous solution, of 9.1% (i.e. the sum of the contents of A and B in Example 1): all of the other parameters are kept identical to those of Example 1.

EXAMPLE 4

This is also a comparative example, in the sense that the conditions of Example 1 are reproduced, but using, as reinforcer, sized glass fibres marketed by the company P.P.G. under the reference "6313" as being suited to the technique of moulding by spraying.

Table 1 below collates, for each of these four examples, the following data:

A—the spraying conditions:
  the type of spraying, t-spray, expressed in seconds,
  the thickness of the "carpet" formed by the resin/glass assembly on the mould after spraying, this thickness expressed in mm and measured on the vertical wall (e.v.), on the staircase step e.m. and on the horizontal wall (e.h.). The average thickness of the carpet (e.ave.) is also obtained from these values,
  the winding time (t.wind), expressed in seconds, that is to say the time taken for the unwinding operation which consists in passing a splined roller at the surface of the "carpet".

B—Evaluation of the performance of the glass/resin mixture:
  the uniformity of the carpet (u.carpet),
  the level of flying "fluff", (fly b.), that is to say the level of threads which fly away during the spraying,
  the ease of winding (w.ease),
  the shapeability, observed in the zone of the grooves: (conf.),
  the holding to the wall: (hold),
  the quality of the impregnation: (impreg.)

All of these evaluations are expressed without units, on a scale from 1 (worst) to 3 (best).

TABLE 1

|   |   | EXAMPLE 1 | EXAMPLE 2 | EXAMPLE 3 (comparative) | EXAMPLE 4 (comparative) |
|---|---|---|---|---|---|
| a | $t_{(spray)}$ | 108 | 113 | 132 | 118 |
|   | $t_{(wind)}$ | 230 | 260 | 250 | 250 |
|   | e.v. | 2.3 | 2.6 | 3.4 | 2.3 |
|   | em.m | 2 | 2.1 | — | 2.4 |
|   | e.h. | 2.1 | 2 | 2.9 | 2.1 |
|   | $e_{ave.}$ | 2.1 | 2.2 | 3.1 | 2.3 |
| b | $u_{.carpet}$ | 3 | 3 | 2 | 2.5 |
|   | $b_{.fly}$ | 2.5 | 2.5 | 1.5 | 1.5 |
|   | $e_{.wind}$ | 3 | 3 | 2 | 3 |
|   | conf. | 3 | 3 | 2.5 | 2 |
|   | hold. | 3 | 2.5 | 1 | 1 |
|   | impreg. | 3 | 3 | 2 | 3 |

On reading this table, it is seen that Example 1 allows a particularly uniform "carpet" to be obtained, with rapid impregnation and, above all, good holding to the vertical wall. This is also the case, to a lesser extent, for Example 2, which has slightly inferior but nevertheless sufficient holding to the vertical wall.

On the other hand, Comparative Example 3 shows results which are far poorer overall than those of the other two: the quality of the impregnation is insufficient and the holding to the vertical wall is very poor.

Similarly, Comparative Example 4 also shows the same unsatisfactory results, the holding to the vertical wall also being considerably insufficient.

Furthermore, the spraying against an open mould in Examples 1 and 2 was repeated, but this time carrying out four successive sprayings rather than two: these are numbered Examples 1a and 2a. Even when, in this way, more delicate conditions are adopted, holding to the vertical wall of the resin/reinforcer assembly is still largely sufficient (in the above scale, evaluated at 3 for Example 1a and at 2 for Example 2a), with excellent shapeability (of 3 in both cases), and excellent impregnation (also of 3 in both cases).

In conclusion, it is seen that combining two bonding agents of type A and B is particularly advantageous, since they complement each other in order over all to enhance the performance of the sizing very significantly; this result cannot be expected if either of these agents is used alone.

It should be pointed out that one of the main advantages of the sizing according to the invention is the very significant improvement in the holding to a vertical wall of the resin/reinforcing fibre assembly on a mould, more particularly in the context of a technique of moulding by simultaneous spraying.

In addition, the value of also adapting the composition of the glass fibre, in particular its yarn count, as a function of the type of spraying envisaged can also be pointed out.

What is claimed is:

1. Glass fiber coated with a sizing composition, characterized in that the said sizing composition, which is obtained from an aqueous solution, comprises as bonding film-forming agents a combination:
  of at least one low-molecular-weight polyvinyl acetate A,
  of at least one thermally self-crosslinking copolymer B of vinyl acetate and at least one other different monomer in an A/B weight ratio greater than or equal to 1.

2. Coated glass fiber according to claim 1, characterized in that the A/B weight ratio is between 1.3 and 10.

3. Coated glass fiber according to claim 1, characterized in that the polyvinyl acetate A has a molecular weight of not more than 60,000.

4. Coated glass fiber according to claim 1, characterized in that the polyvinyl acetate A has a hot solubility in toluene of at least 70%.

5. Coated glass fibre according to claim 1, characterized in that the (copolymer B) is a copolymer of vinyl acetate and of N-methylolacrylamide.

6. Coated glass fiber according to claim 1, characterized in that the copolymer B has a hot solubility in toluene of not more than 60%.

7. Coated glass fiber according to claim 1, characterized in that the sizing composition comprises at least one plasticizer C, to plasticize the polyvinyl acetate A and/or the copolymer B.

8. Coated glass fiber according to claim 7, characterized in that the weight ratio C/(A+B) is between 0.05 and 0.2.

9. Coated glass fiber according to claim 7 or 8, characterized in that the sizing composition contains at least one surfactant D.

10. Coated glass fiber according to claim 1, characterized in that the sizing composition comprises at least one coupling agent.

11. Coated glass fiber according to claim 1, characterized in that the sizing composition comprises at least one lubricant and/or antistatic agent G.

12. Coated glass fibers according to claim 1, characterized in that they have a filament diameter of 12 to 15 micrometers and a yarn count of 40 to 50 tex.

13. Coated glass fiber according to claim 1, characterized in that the dry extract of the sizing composition is between 2 and 10%.

14. Sizing composition in aqueous solution intended to coat glass fibers, characterized in that it contains:

a low-molecular-weight polyvinyl acetate A in a content, as a percentage by weight of the aqueous solution, of between 5 and 9, a thermally self-crosslinking polyvinyl acetate copolymer B in a content, as a percentage by weight of the aqueous solution, of between 1 and 4, and also with an A/B weight ratio $\geq 1$, an aminosilane E and an unsaturated silane F in a content, as a percentage by weight of the aqueous solution, of between 0.05 and 5, one (or more) plasticizer(s) C in a content, as a percentage by weight of the aqueous solution, of between 0.4 and 0.9, at least one surfactant D in a content, as a percentage by weight of the aqueous solution, of between 0.1 and 0.4, one (or more) lubricant(s) G in a content, as a percentage by weight of the aqueous solution, of between 0.1 and 0.3.

15. Process for the manufacture of the sizing composition according to claim 14, characterized in that it comprises:

a step of hydrolysis of the silane derivatives E and F in a solution S1, a step of plasticization of compounds A and B together with "C" in the presence of the compounds D and G in a solution S2, mixing of solutions S1 and S2.

16. Process for the manufacture of a composite material comprising at least one polymer matrix made of thermosetting resin and reinforcing cut glass fibers, at least some of the said fibers being fibers coated and sized according to claim 1, which comprises molding by simultaneous spraying of the said resin and the said cut glass fibers against an open mold by means of a spray gun which cuts said glass fibers and sprays the cut glass fibers and the thermosetting resin onto the mold at the same time.

17. Coated glass fiber according to claim 2, characterized in that the A/B weight ratio is between 2.5 and 6.0.

18. Coated glass fiber according to claim 3, characterized in that the polyvinyl acetate A has a molecular weight between 60,000 and 40,000.

19. Coated glass fiber according to claim 3, characterized in that the polyvinyl acetate A has a molecular weight of about 50,000.

20. Coated glass fiber according to claim 4, characterized in that the polyvinyl acetate A has a hot solubility in toluene between 70 and 95%.

21. Coated glass fiber according to claim 4, characterized in that the polyvinyl acetate A has a hot solubility in toluene of about 85%.

22. Coated glass fiber according to claim 6, characterized in that the copolymer B has a hot solubility in toluene of about 50%.

23. Coated glass fiber according to claim 7, characterized in that the sizing composition comprises at least one plasticizer C, to plasticize the polyvinyl acetate A and/or the copolymer B, selected from the group consisting of glycol derivatives.

24. Coated glass fiber according to claim 7, characterized in that the sizing composition comprises at least one plasticizer C, to plasticize the polyvinyl acetate A and/or the copolymer B, which plasticizer is a mixture of diethylene glycol dibenzoate and dipropylene glycol dibenzoate.

25. Coated glass fiber according to claim 8, characterized in that the weight ratio C/(A+B) is between 0.10 and 0.15.

26. Coated glass fiber according to claim 9, characterized in that the sizing composition contains at least one nonionic surfactant D.

27. Coated glass fiber according to claim 10, characterized in that the sizing composition comprises at least one coupling agent selected from the group consisting of silanes.

28. Coated glass fiber according to claim 10, characterized in that the sizing composition comprises at least one coupling agent which is a combination of at least two silanes.

29. Coated glass fiber according to claim 10, characterized in that the sizing composition comprises a combination of an aminosilane E and an unsaturated silane F.

30. Coated glass fiber according to claim 11, characterized in that the sizing composition comprises at least one lubricant and/or antistatic agent G which is an organic quaternary ammonium salt cationic agent.

31. Coated glass fibers according to claim 12, characterized in that they have a filament diameter of 13 micrometers and a yarn count of 45 tex.

32. Coated glass fiber according to claim 13, characterized in that the dry extract of the sizing composition is about 6%.

33. Sizing in aqueous solution according to claim 14, containing one (or more) plasticizer(s) C, which are glycol derivative(s), in a content, as a percentage by weight of the aqueous solution, of between 0.4 and 0.9, and one (or more) lubricants which is (are) organic quaternary ammonium salt(s) in a content, as a percentage by weight of the aqueous solution, of between 0.1 and 0.3.

34. Process according to claim 16, in which the thermosetting resin is a polyester resin and/or epoxy resin.

* * * * *